United States Patent [19]

Ochs et al.

[11] Patent Number: 5,505,293
[45] Date of Patent: Apr. 9, 1996

[54] SPIRAL FREEZER INFEED ASSIST DRIVE SYSTEM

[75] Inventors: Gregory L. Ochs, Kirkland; James E. Aikins, Renton, both of Wash.

[73] Assignee: York Food Systems, Preston, Wash.

[21] Appl. No.: 376,808

[22] Filed: Jan. 23, 1995

[51] Int. Cl.⁶ .................................................. B65G 43/00
[52] U.S. Cl. .................... 198/810.04; 198/778; 198/831
[58] Field of Search ................................... 198/778, 810, 198/813, 831, 832, 810.04

[56] References Cited

U.S. PATENT DOCUMENTS

| 2,413,339 | 12/1946 | Stadelman | 198/831 |
| 2,635,736 | 4/1953 | Rust | 198/810 |
| 3,777,879 | 12/1973 | Dehne | 198/810 |
| 3,963,115 | 6/1976 | Teske et al. | 198/810 X |
| 4,657,131 | 4/1987 | Brychta et al. | 198/810 |
| 5,105,934 | 4/1992 | Cawley | 198/778 |
| 5,361,888 | 11/1994 | Brown et al. | 198/778 X |
| 5,375,695 | 12/1994 | Dasinger et al. | 198/778 |

*Primary Examiner*—James R. Bidwell
*Attorney, Agent, or Firm*—Harry M. Cross, Jr.

[57] ABSTRACT

A food processing system, particularly a spiral food freezing system, comprises a food processing section, a conveyor belt for conveying food products through the food processing section, and a conveyor belt tension reducer engaged with the conveyor belt to reduce tension in the conveyor belt at a selected location, such as at the commencement of an infeed section to the food processing section. The tension reducer is provided as an infeed assist drive that is engaged with the conveyor belt at the commencement of the system's infeed section to drive slack into the conveyor belt at the transition from a conveyor belt return section to the inlet section.

8 Claims, 6 Drawing Sheets

SPIRAL FREEZER INFEED ASSIST DRIVE SYSTEM

BACKGROUND OF THE INVENTION

1. Field of the Invention

This invention relates to food processing systems employing conveyor belts on which food products are deposited for process. More particularly, this invention relates to food freezing systems employing conveyor belts, such as spiral freezer systems.

2. Brief Description of the Prior Art

Food processing systems, such as spiral food freezer systems, employ food product conveyor belts that must articulate transversely and longitudinally and are therefore subject to tensile and bending stress and forces. The extent of these stresses and forces can place severe limitations on the configuration of the system. For example, some such spiral food freezer systems can only provide an inlet section for the deposit of food products for processing of a fairly minimum length so that the strength of the conveyor belt segments that make up the conveyor belt is not exceeded. Consequently, such systems sometimes cannot accommodate long inlet sections that might be a desirable feature for some processing installations. Also, consequently, such systems might be limited in the choice of conveyor belt design and construction configurations to those that would provide a strong enough conveyor belt to withstand the stress and forces that will act on the conveyor belt.

SUMMARY OF THE INVENTION

It is a primary object of this invention to provide a spiral food freezer system having a conveyor belt infeed assist drive system that will enable the stresses and forces on the conveyor belt to be reduced. It is another object of this invention to provide such a system wherein the inlet section of the conveyor system can be elongated beyond what would be feasible in the absence of the infeed assist drive system.

In accordance with these objectives, the invention comprises a food processing system, particularly a spiral food freezing system, having a food processing section, a conveyor belt for conveying food products through the food processing section, and a conveyor belt tension reducer engaged with the conveyor belt to reduce tension in the conveyor belt at a selected location, such as at the commencement of an infeed section to the food processing section. The tension reducer is provided as an infeed assist drive that is engaged with the conveyor belt at the commencement of the system's infeed section to drive slack into the conveyor belt at the transition from a conveyor belt return section to the inlet section.

More generally, the food processing system of this invention comprises a food processing section, such as a spiral freezing compartment, that includes a food product inlet and a food product outlet, a conveyor for conveying food products to the food product inlet and through the food processing section to the food product outlet, and a conveyor tension reducer engaged with the conveyor whereby tension in the conveyor is reduced as a result of the engagement. The conveyor tension reducer comprises a conveyor engaging mechanism for drivingly engaging the conveyor, a drive mechanism for operating the conveyor engaging mechanism whereby the tension in the conveyor is reduced downstream of the conveyor engaging mechanism, a sensing mechanism for sensing a condition of the conveyor, and a control mechanism coupled to the sensing mechanism and to the drive mechanism for controlling the drive mechanism in response to the sensed condition of the conveyor.

DESCRIPTION OF THE PREFERRED EMBODIMENT

Figure 1:
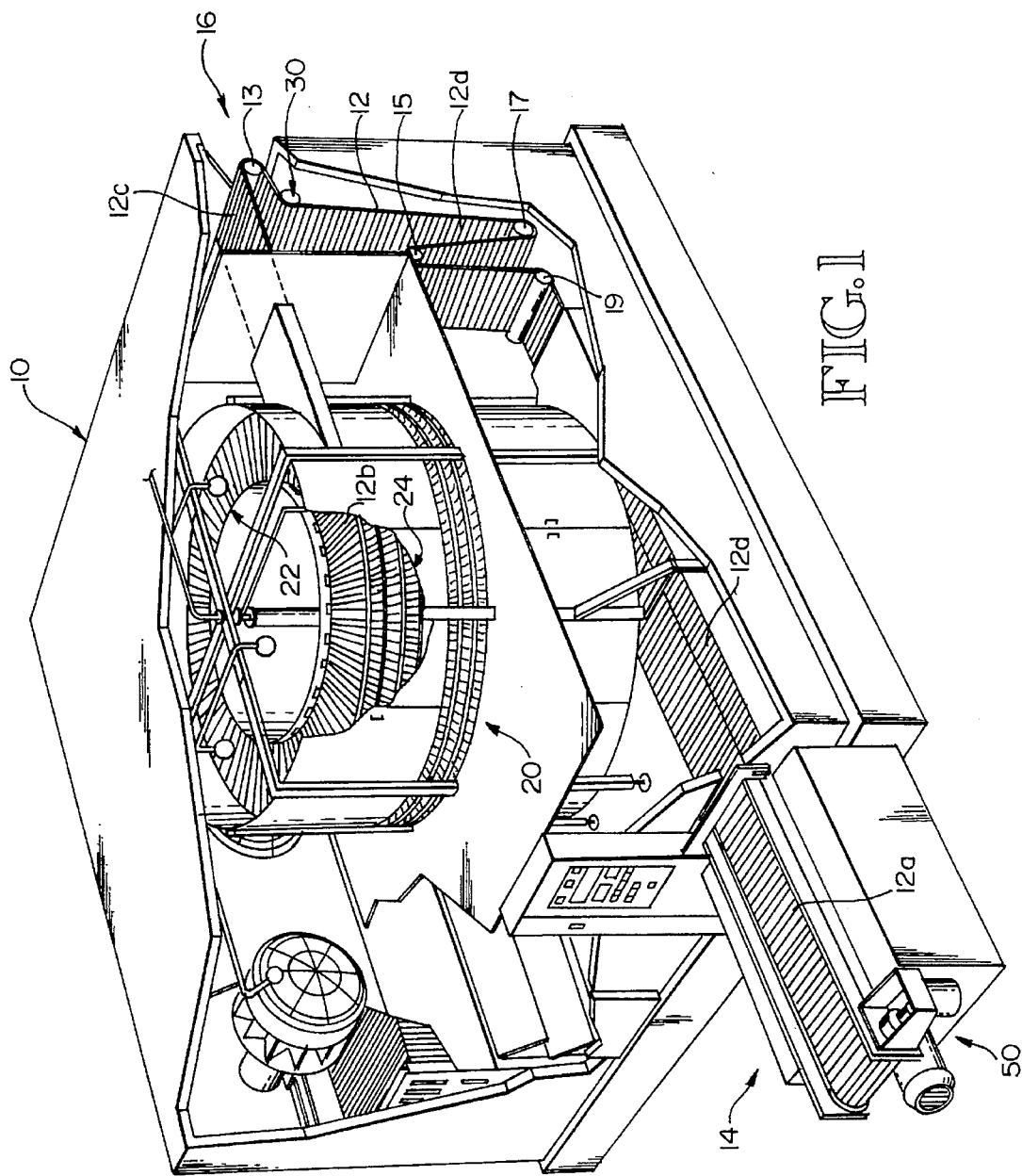
FIG. 1 illustrates, in perspective, a spiral food processing system, specifically a spiral freezer system, employing an infeed assist drive system.

Spiral Food Freezers, of the type illustrated in FIG. 1, comprise a freezer housing 10 within which an endless product conveyor belt 12 is transported from a product inlet section 14 to a product outlet section 16. Food products are deposited on the conveyor belt 12 at the inlet section 14, are frozen to the degree required within the housing 10, and are deposited to further handling or processing systems from the outlet section 16. A primary advantage of a spiral food freezer system is that a substantial food processing time can be achieved for a given floor area occupied by the system. This advantage is achieved by providing, within housing 10, a central drum conveyor assembly 20 that has a conveyor belt-driving drum 22 that is rotated about a vertical axis, and a helical conveyor assembly 24. The conveyor belt 12 receives food product at the inlet section 14; travels from the inlet section 14 into the housing 10 and through the helical conveyor assembly 24, entering at the bottom of the belt-driving drum 22 and leaving at the top; and then travels through the outlet section 16, where the food product is deposited from the conveyor belt, and returns to the inlet section 14. Thus, the conveyor belt 12 travels from an inlet course 12a, through a helical course 12b, to an outlet course 12c, and then returns through a return course 12d. It is typical of spiral food freezer systems to have the inlet and outlet courses 12a, 12c to be linearly straight, tangent to the helical course 12b, and linearly-aligned with one another—albeit at different elevations. Therefore, the return course 12d is linearly straight, also, although taking a vertically-altering path from the outlet section 16 back to the inlet section 14.

In a typical spiral food freezer system, the conveyor belt 12 and the belt-driving drum 22 are cooperatively associated so that the drum 22 and the inner edge of the belt 12 are brought together in a suitable fashion whereby the rotating drum 22 drives the belt 12 around its helical path 12b. This may be accomplished by a frictional engagement of the two, or it may be accomplished by a positive, physical interlocking engagement of the two. In addition to the driving force imparted by the drum 22, a secondary conveyor belt driving assembly 30 is provided in the housing 10, adjacent the outlet section 16, and within the path of the return course 12d. This secondary driving assembly 30 aids in pulling the belt 12 through and from the drum conveyor assembly 20 and through the outlet section 16. In typical systems, however, transport of the belt 12 from the secondary driving assembly 30 to the entry into the drum conveyor assembly 20 is unassisted. Therefore, the tension in the belt segments within the return and inlet courses 12d, 12a, extending from the secondary driving assembly 30 to the drum conveyor assembly 20, rises significantly as the belt segments approach the drum conveyor assembly inlet. In order to limit these tension forces to an acceptable degree, various design considerations must be compromised, such as the configuration of conveyor belt 12, the tolerable length of the inlet section 14, the configuration of the drum conveyor assembly 20, the speed of the drum conveyor assembly 20 and so forth.

The present invention, however, is not typical in that an infeed assist drive system 50 is provided at the commencement of the inlet section conveyor course 12a. This system is designed to pull the conveyor belt 12 along the return course 12d and to deliver the belt segments to the inlet course 12a in an untensed condition so that the drum conveyor assembly 20 will not have to overcome resistive forces within the return course 12d. As a result, the tension in the conveyor belt segments as they reach the drum conveyor assembly 20 will be reduced. Furthermore, where it would be desirable to increase the length of the inlet course 12a, this may be accomplished by employing the infeed assist drive system 50 of the present invention without creating an intolerable stress on the belt segments as they enter the drum conveyor assembly inlet or on the drum conveyor assembly 20 itself.

Conveyor belt 12 is flexible and selectively, longitudinally adjustable. Consequently, belt 12 can be drawn around various driving and idler rolls as required by the spiral freezing system, such as at 13, 15, 17, 19, 30 and elsewhere in the system; and can be drawn from a linear, straight section such as inlet course 12a into a curved section such as helical course 12b, and from a curved section such as helical course 12b into a linear, straight section such as outlet course 12c. The various belt segments that make up belt 12, therefore, must structurally accommodate turning laterally, i.e. perpendicular to the plane of the belt from one spatial plane to another, as would be required when the belt traverses a drive or an idler roll; and transversely within a spatial plane as would be required when the belt is drawn into and out of its helical course 12b. A common belt configuration for belt 12 comprises a multiplicity of transverse rods that are linked together at their ends by interlocking links, the interlocking links permitting the belt 12 to turn laterally (i.e. perpendicularly to the plane of the belt) and transversely (i.e. within the plane of the belt). Depending on the design configuration of the belt segments, when the belt segments are drawn from a linear, straight course, such as course 12a, into a transverse curve such as course 12b, either the inner edges of the belt segments will condense together or the outer edges will expand apart to enable the belt to traverse the transverse curve. Likewise, when the belt segments are drawn from a transverse curve, such as course 12b, into a straight, linear course, such as course 12c, either the inner edges of the belt segments will expand apart or the outer edges will condense together to enable the belt to traverse the straight section. In some belt configurations, it may be possible in any given situation for both the inner and outer segment edges to shift relative to adjacent segments to accomplish the necessary transverse movement of the belt segments.

However the belt segments are configured to enable the belt to bend laterally and turn transversely, as above described, a result is that the belt segments are longitudinally displaceable relative to one another. The infeed assist drive system 50 takes advantage of this feature to relieve stress on the belt segments as they enter the inlet course 12a. Thus, system 50 both pulls belt 12 along return course 12d but also develops slack in the belt at the commencement of the inlet course 12a. Consequently, tension and stress buildup on the belt segments entering the inlet to the drum conveyor assembly 20 are made immune to the stresses and forces on the belt upstream of the inlet course 12a.

Figure 2:
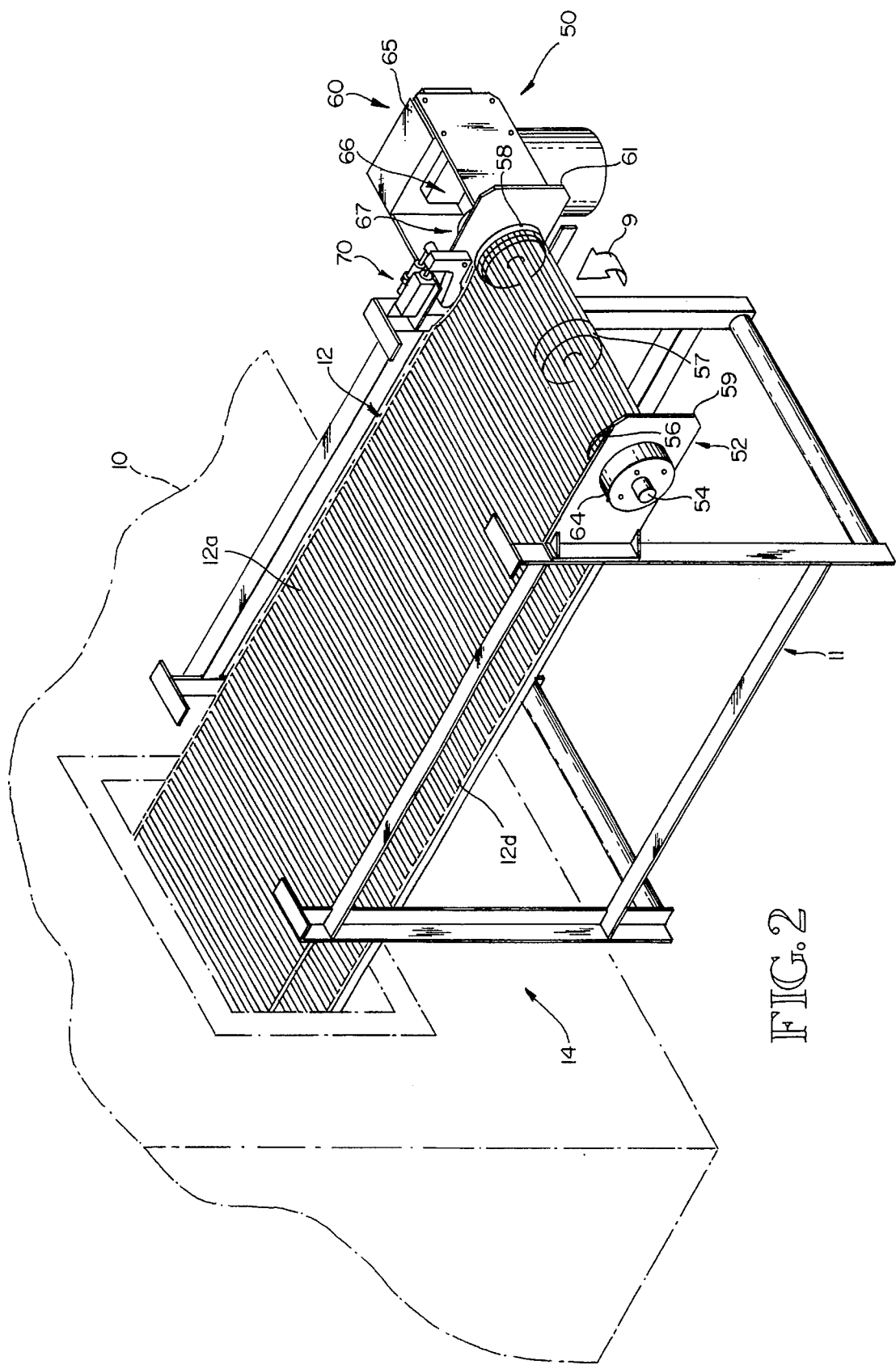
FIG. 2 illustrates, in perspective, the inlet section of the FIG. 1 system.
Figure 3:
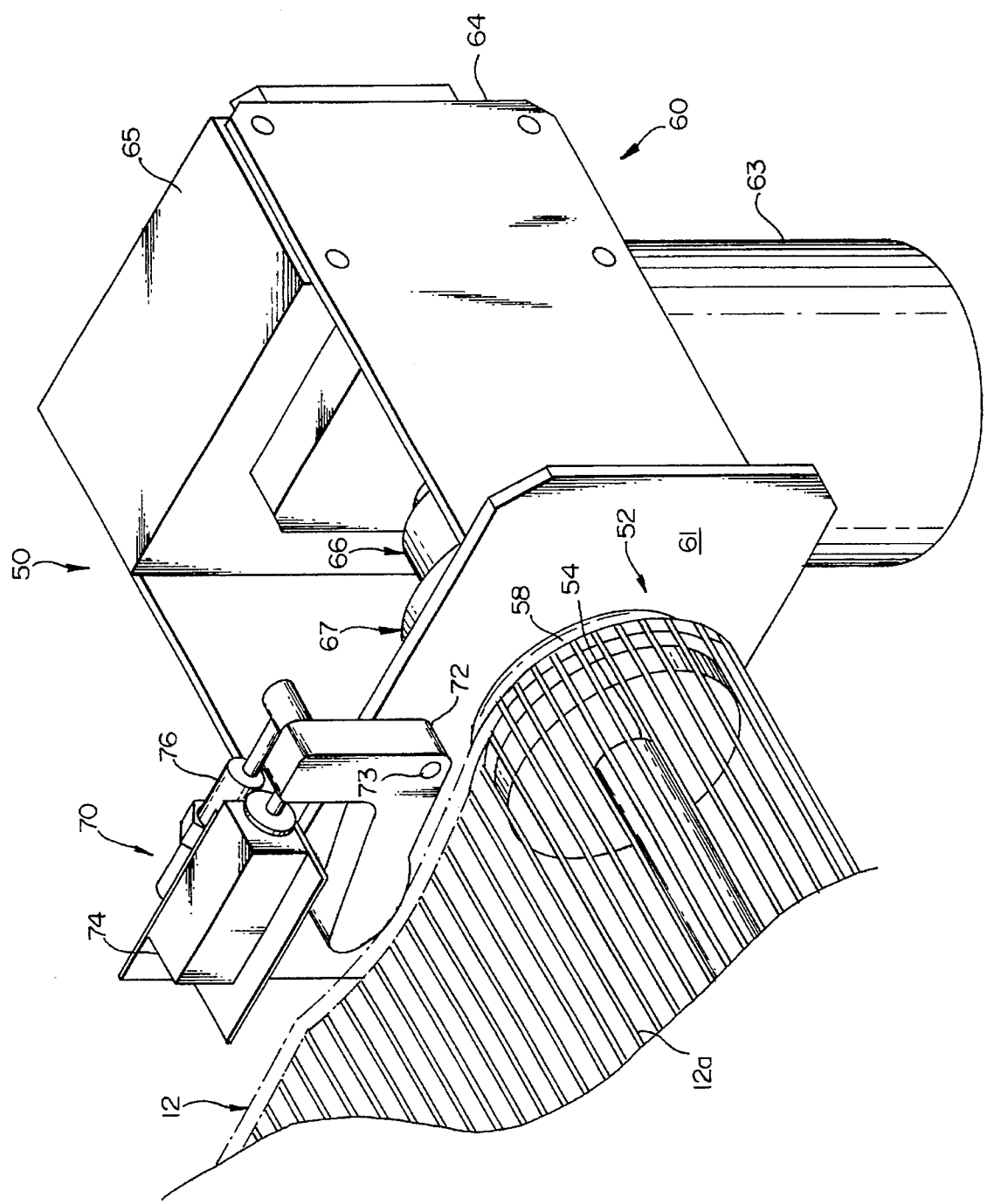
FIG. 3 illustrates, in perspective, an enlarged detail of a portion of the infeed assist drive system of this invention.
Figure 4:
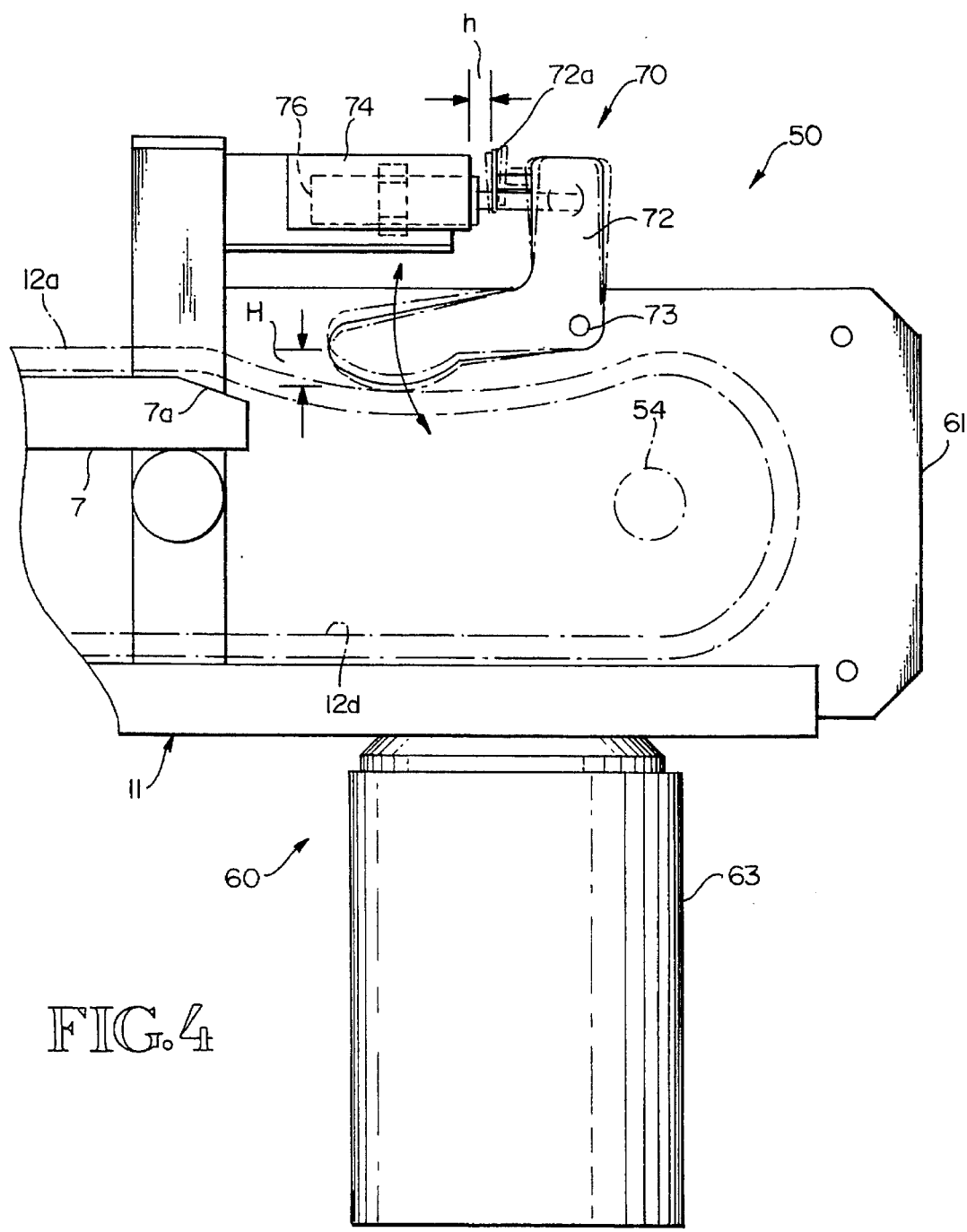
FIG. 4 further illustrates, in vertical elevation, the infeed assist drive system illustrated in FIG. 3.

FIGS. 2, 3 and 4 further illustrate the relationship of the infeed assist drive system 50 and the conveyor inlet section 14. Referring to these Figures, system 50 comprises a conveyor drive assembly 52, motor drive assembly 60 and a belt sensing assembly 70. Conveyor drive assembly 52 comprises a drive shaft 54, left and right conveyor belt drive sprockets 56, 58 affixed to shaft 54, and left and right mounting brackets 59, 61 that mount drive shaft 54 to the outer end of the structural framework 11 for inlet section 14. The outer end of shaft 54 is mounted to left bracket 59 by a bearing block 64 fastened to the outer side of bracket 59. The inner end of shaft 54 is mounted to right bracket 61 by a bearing block 67 fastened to the outer side of bracket 61. Drive shaft 54 also mounts an idler guide roll 57 at its midpoint. Belt 12 is wrapped around drive sprockets 56, 58 and idler roll 57 and is drivingly engaged with the cogs of sprockets 56, 58. Drive shaft 54 is rotatable in a direction to cause belt 12 to move in the direction of indicator arrow 9 to carry belt 12 from the underlaying return course 12d up around sprockets 56, 58 to the overlaying inlet course 12a.

Drive shaft 54 is rotated by a motor assembly 60 that is mounted to bracket 61 by a housing mounting bracket 64. Motor 63 drivingly engages shaft 54 through a gearbox 65 and through a coupling subassembly 66. Motor assembly 60 rotates drive shaft 54 in response to control signals transmitted by a belt-sensing assembly 70. Belt-sensing assembly 70 comprises belt-contacting position arm 72 pivotally mounted to bracket 61 at 73, a proximity switch 74 mounted to react to the position of arm 72, and a shock absorber 76 mounted to affect the pivotal motion to arm 72.

Infeed drive assist system 50 maintains degree of slack in conveyor belt 12 at the commencement of the inlet section 14 by controllably driving motor 63 faster or slower as required to keep a desired degree of slack in the conveyor belt segments coming off the top of the drive sprockets 56, 58. The slack belt segments cause a droop in the belt 12 as it leaves the drive sprockets 56, 58 (as seen in FIG. 4) and before it enters the inlet section 12a so that the tension in the belt is relieved as the belt transitions from the return section 12d to the inlet section 12a. The droop in the belt is sensed by the position arm 72. A switch target 72a on arm 72 causes proximity switch 74 to emit a signal corresponding to the position of the belt segments as determined by the position of arm 72. The signal emitted by switch 74 results in a control signal sent to control the speed of motor 63. When the droop in belt 12 increases, as viewed in FIG. 4 for example, the belt's vertical location underneath arm 72 will drop and the arm 72 will pivot about 73 to cause target 72a to approach switch 74 thereby causing switch 74 to emit a signal that will effect a slowing of motor 63. Conversely, when the droop in belt 12 decrease, the belt's vertical location underneath arm 72 will raise and the arm 72 will pivot about 73 to cause target 72a to retreat from switch 74 thereby causing switch 74 to emit a signal that will effect a speeding up of motor 63. Depending on the associated electrical/electronic circuitry, the pivoting action of arm 72 may cause an undue "hunting" effect if not dampened. Hence shock absorber 76, a form of dash pot, will interact with arm 72 to retard the speed at which arm 72 can pivot about 73. Alternately, the associated electrical/electronic circuitry could include appropriate signal dampening circuitry to accomplish the same end. FIG. 4 illustrates i dashed lines the pivotal action of arm 72 as it pivots around pivot 73 and its affect on the position of target 72a relative to switch 74; the varying distance "h" being directly proportional to the varying droop "H" in the belt 12.

Figure 5:
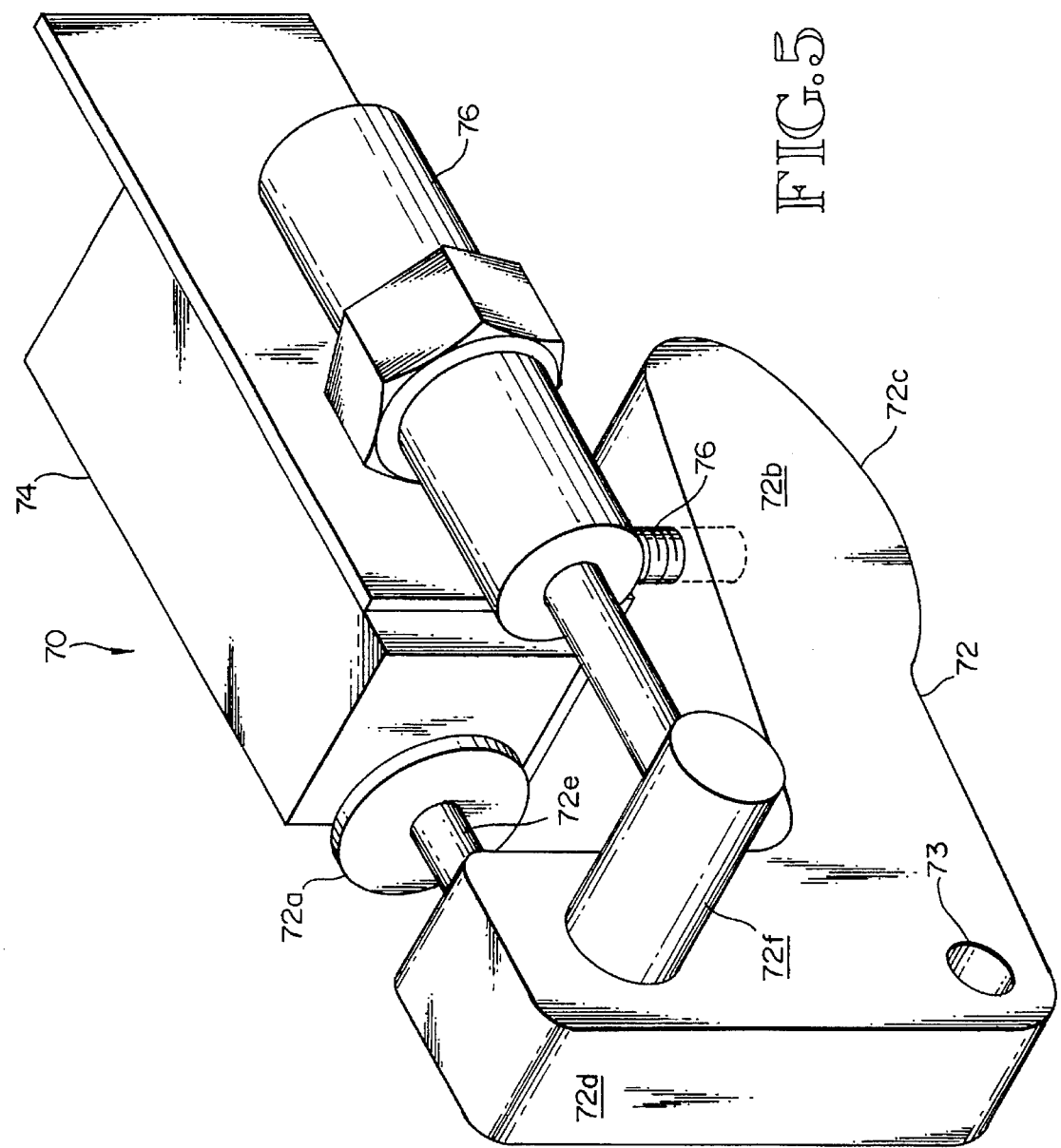
FIG. 5 illustrates, in perspective, an enlarged detail of a portion of the FIG. 3 infeed assist drive system.
Figure 6:
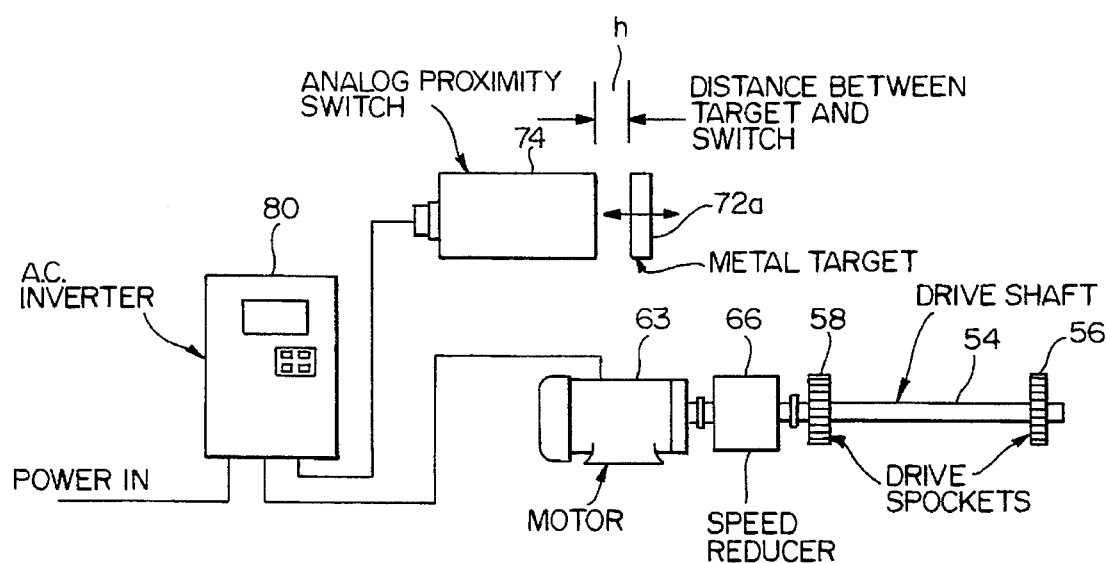
FIG. 6 illustrates an electrical/electronic control subsystem, in diagram form, of a suitable electrical/electronic control for the infeed assist drive system.

As illustrated in FIGS. 4 and 5, the arm 72 comprises a somewhat L-shaped element having a horizontal leg 72b provided with an arcuate (convex) belt-contacting surface 72c, and a vertical leg 72d to which target 72a is mounted by target-mounting pin 72e. Arm pivot 73 resides at the intersection of leg segments 72b and 72d. Arm leg segment 72d also mounts a damper-actuating pin 72f for contact with shock absorber 76 such that the resistance to movement inherent within shock absorber 76 will act through pin 72f to resist pivotal movement of arm 72 about pivot 73. Arm 72 may be fabricated from a suitably dense material, such as ultra high molecular weight polyethylene, so that the force exerted on horizontal leg 72b, acting under the influence of a compression spring 71, will keep belt-contacting surface 72c in close proximity to belt 12. Spring 71 insures that leg 72b will be maintained in tight contact with belt 12.

The degree of droop "H" in belt 12 is dependent, not only on the speed of motor 63, but also on the downstream movement of belt 12 along the inlet course 12a. If belt 12 should travel faster or slower along the inlet course 12a, for whatever reason, that movement will affect droop "H". Thus, droop "H" is a reaction of the movement of the belt segments upstream and downstream and it is this relative "H" that must be controlled so that the infeed assist drive system 50 will insulate the belt segments, from drive sprockets 56, 58 forward, from forces and stresses in the belt that might be present upstream in the return course 12d. An advantage of the present configuration of system 50 is that it is only concerned with the effect, "H", and is not concerned with the upstream or downstream factors within the belt that might influence "H". Consequently, system 50 is sensitive to any change in "H" regardless of its cause, to whatever degree is desired. The selection of the dampening characteristics of shock absorber 76 and the reaction timing of the electrical/electronic circuitry associated with switch 74 will determine the sensitivity of system 50 to changes in "H".

The droop "H" can be accommodated by tapering the inlet 7a to a belt-supporting railing 7 at the commencement to inlet section 12a; and by providing sufficient length between the commencement of inlet section 12a and drive shaft 54 to accommodate the degree of droop "H" desired. If additional support of the belt segments in the vicinity of "H" is required, a concave support railing could be extended from railing 7 so long as the concave support railing enabled the belt's elevation in the vicinity of arm contact surface 72c to fluctuate enough to permit the necessary range in "H".

Since a typical conveyor belt 12 is composed of transverse rods linked together by longitudinally-moveable end links, other ways of sensing the effective relief of upstream tension, or the effective isolation of the belt segments in the inlet section 12 from upstream stresses and forces, could be provided. For example, a belt position sensor could be employed to detect a condensing of the belt segments together, or to detect the degree of belt segment condensing, between drive sprockets 56, 58, and the commencement of the inlet section 12a; and the speed of motor 63 controlled in accordance with that sensed condition.

During operation of system 50, referring to FIGS. 3–6, as tension in belt 12 at the commencement of the inlet section 12a increases, the belt would straighten out compared to its position shown in FIG. 4. Greater tension would result in higher belt position, and maximum tension would result in a relatively flat belt with no droop at all. This belt position is followed by the pivoting arm 72, with the arm position being monitored by the proximity switch 74. A corresponding position signal is sent by the proximity switch 74 to a variable frequency drive in the control panel. Switch 74 may conveniently be an analog output proximity switch that outputs a variable 4–20 milliamp signal based on its distance "h" from target 72a. The output of switch 74 is received by a variable frequency inverter, the inverter 80 being in turn coupled to control motor 63. The inverter converts the input signal to an output voltage and frequency which in turn drives the infeed assist electric motor 63. As the target moves closer to the proximity switch, the signal from the switch increases, indicating an increasing degree of belt droop, and the inverter processes this signal increase and produces a lower output voltage and frequency thus slowing down the motor. As belt tension increases, the target moves away from the switch, lowering the input signal to the inverter. The system constantly modulates and eventually settles out to a stable state. To limit tension in the belt, the frequency inverter directs motor 63 to accelerate as the belt rises from its lower supported position. Higher tension causes the pivoting arm target 72a to move further away from the proximity switch 74, generating a weaker signal to the inverter. This weak signal causes the inverter to increase the output to the motor 63 resulting in increased speed of drive shaft 54. As the belt speed increases, the droop "H" of the belt is increases resulting in reduced belt tension. The arm 72 is constantly modulating, speeding up and slowing down motor 63 to keep tension in the belt at a low level. As a consequence of the action of shock absorber 76, there is minimal "hunting" so that the operation is very smooth.

Motor 63 is preferably an electric drive gear motor mounted and coupled to drive shaft 54 by a right angle gearbox. Brackets 59, 61 and drive shaft 54 with its drive sprockets 56, 58 may conveniently provide a gap of between about six to eight inches before the commencement of the inlet section 12a to accommodate the necessary range of droop "H" to enable the system to operate efficiently.

Notwithstanding that a preferred embodiment of the invention has been described herein, variations in the design may be made. The scope of the invention, therefore, is only to be limited by the claims appended hereto.

The embodiments of the invention in which an exclusive property is claimed are defined as follows:

1. A food processing system comprising food processing means, food product conveyor means associated with said food processing means, and conveyor belt infeed assist drive means;

a) said food processing means comprising a food product inlet, a food processing section and a food product outlet;

b) said food product conveyor means comprising an inlet course terminating at said food product inlet for receiving food products and delivering such food products to said food product inlet, a food processing course extending through said food processing section from said food product inlet to said food product outlet, an outlet course, and a return course extending from said outlet course to said inlet c) said food product conveyor means further comprising a conveyor belt constructed of a plurality of transverse segments linked together to form an endless conveyor belt formed of interlocking belt segments that can be expanded apart and condensed together so as to enable said conveyor belt to travel through transverse curves; and conveyor belt driving means engaged with said conveyor belt means for driving said conveyor belt through said food processing course and through said return course;

d) said conveyor belt infeed assist drive means being drivingly engaged with said conveyor belt in said inlet course so that tension in said conveyor belt is reduced in said inlet course as a result of the engagement, said conveyor belt infeed assist drive means comprising conveyor belt engaging means for drivingly engaging said conveyor belt in said infeed course downstream of said return course, drive means for operating said conveyor belt engaging means so as to produce a slack condition in said conveyor belt in said inlet course sufficient to enable said belt segments to be expanded apart and condensed together along said inlet course and along said food processing course free of interference from forces in said return course, sensing means for sensing a condition of said conveyor belt, and control means coupled to said sensing means and to said drive means for controlling said drive means in response to said sensing means sensing said condition of said conveyor belt.

2. The system of claim 1 wherein said drive means comprises drive shaft means, sprocket means engaged with said conveyor belt in said inlet course, and motor means connected to said drive shaft means; wherein said sensing means comprises conveyor belt contact means disposed in physical contact with an upper surface of said conveyor belt in said inlet course whereby vertical changes in the elevation of said upper surface can be sensed; and wherein said control means comprises switch means providing an output signal responsive to changes in the sensed surface elevation, and circuit means coupled to said switch means and to said motor means for controlling said motor means responsive to said output signal.

3. The system of claim 2 wherein said sprocket means is located at the commencement of said inlet course so that the entire inlet course is isolated from tension and stress on the belt segments upstream of said inlet course.

4. The system of claim 2 wherein said motor means, said sensing means, and said control means are combined into an auxiliary unit and mounted externally of said conveyor means so that they may be removed from said conveyor means so as to convert said sprocket means to an idler undriven condition, and so that they may be added to said conveyor means so as to convert said sprocket means to a driven tension-reducing condition.

5. The system of claim 2 wherein said sensing means comprises a position sensing member mounted to rotate so as to indicate changes in the elevation of said upper surface of said conveyor belt in said inlet course, and a switch target mounted on said sensing member so as to move toward and away from said switch means in response to changes in elevation of said conveyor belt surface; and wherein said switch means comprises a proximity switch means sensitive to said target for producing a variable output signal corresponding to the distance between said switch and said target.

6. The system of claim 5 wherein said conveyor belt engaging means engages said conveyor belt in said inlet course at a transition between said return course and said inlet course; and wherein said inlet course includes conveyor belt support means located with respect to said conveyor belt engaging means and constructed so that said conveyor belt can droop when in a slackened condition at the commencement of said inlet course; and wherein said position sensing member is mounted to sense the droop in said conveyor belt so as to effect a speeding up or slowing down of said motor means whereby said droop is maintained to provide a slackened condition in said conveyor belt at the commencement of said inlet course.

7. The system of claim 5 wherein said sensing member has a convex conveyor belt-contacting surface disposed in contact with said conveyor belt upper surface.

8. The system of claim 5 wherein said control means includes a shock absorber coupled to said sensing member so as to resist movement of said switch target toward and away from said switch means.

* * * * *